United States Patent
Sui et al.

(10) Patent No.: US 11,319,489 B2
(45) Date of Patent: May 3, 2022

(54) METHOD FOR RECOVERING CARBON FIBERS FROM COMPOSITE MATERIAL WASTE

(71) Applicant: The Boeing Company, Chicago, IL (US)

(72) Inventors: Gang Sui, Beijing (CN); Xiaoping Yang, Beijing (CN); Xin Jin, Beijing (CN); Zhu Ming, Beijing (CN); Zhandong Wang, Beijing (CN)

(73) Assignee: The Boeing Company, Chicago, IL (US)

(*) Notice: Subject to any disclaimer, the term of this patent is extended or adjusted under 35 U.S.C. 154(b) by 329 days.

(21) Appl. No.: 16/482,430

(22) PCT Filed: Mar. 30, 2018

(86) PCT No.: PCT/US2018/025389
§ 371 (c)(1),
(2) Date: Jul. 31, 2019

(87) PCT Pub. No.: WO2018/183838
PCT Pub. Date: Oct. 4, 2018

(65) Prior Publication Data
US 2020/0002619 A1    Jan. 2, 2020

(30) Foreign Application Priority Data
Apr. 1, 2017    (CN) .......................... 201710213479.0

(51) Int. Cl.
*D01F 9/12*    (2006.01)
*C10B 57/06*    (2006.01)
*C01B 32/05*    (2017.01)
*C10B 53/07*    (2006.01)
*B29B 17/04*    (2006.01)

(52) U.S. Cl.
CPC .............. *C10B 57/06* (2013.01); *B29B 17/04* (2013.01); *C01B 32/05* (2017.08); *C10B 53/07* (2013.01); *D01F 9/12* (2013.01); *B29B 2017/0496* (2013.01)

(58) Field of Classification Search
CPC .................................. D01F 9/12; C01B 32/05
See application file for complete search history.

(56) References Cited

U.S. PATENT DOCUMENTS

| | | | |
|---|---|---|---|
| 8,722,958 B2 * | 5/2014 | Kashimoto | ............ B01J 21/063 588/405 |
| 10,723,954 B2 * | 7/2020 | Gehr | ....................... C10B 57/02 |
| 2016/0039118 A1 | 2/2016 | Gehr | |

FOREIGN PATENT DOCUMENTS

| | | |
|---|---|---|
| CN | 101 928 406 | 12/2010 |
| CN | 102181071 | 9/2011 |
| CN | 103 665 427 | 3/2014 |
| JP | H07-33904 | 2/1995 |
| JP | 2000-43045 | 2/2000 |
| JP | 2001-262158 | 9/2001 |
| JP | 2004-231695 | 8/2004 |
| JP | 2005-255835 | 9/2005 |
| JP | 2010-13657 | 1/2010 |
| JP | 2004 091719 | 12/2010 |
| JP | 2013-146649 | 8/2013 |
| JP | 2013-237716 | 11/2013 |
| JP | 2016-521295 | 7/2016 |
| WO | WO 2015/147021 | 10/2015 |

OTHER PUBLICATIONS

China National Intellectual Property Administration, Office Action, with English translation, App. No. 201710213479.0 (dated Mar. 29, 2019).
International Searching Authority: Written Opinion, App. No. PCT/US2018/025389.
Japan Patent Office, Office Action, with English translation, App. No. 2019-542440 (dated Feb. 21, 2022).

* cited by examiner

*Primary Examiner* — Stuart L Hendrickson
(74) *Attorney, Agent, or Firm* — Walters & Wasylyna LLC

(57) ABSTRACT

A method for recovering carbon fibers from composite material waste includes coating a solid acid powder onto a surface of a composite material waste having carbon fibers and a resin matrix, pyrolyzing the resin matrix of the coated composite material waste in an inert environment, and oxidizing the pyrolyzed resin of the composite material waste in an air environment.

20 Claims, 3 Drawing Sheets

METHOD FOR RECOVERING CARBON FIBERS FROM COMPOSITE MATERIAL WASTE

PRIORITY

This application is a U.S. national phase application of Intl. App. No. PCT/US2018/025389 filed on Mar. 30, 2018, which claims priority from Chinese Patent Application No. 201710213479.0 titled "A Method for Recycling Carbon Fibers from Composite Material Wastes via Two-Step Pyrolysis," which was filed on Apr. 1, 2017.

FIELD

The present description belongs to the field of carbon fiber recycling, particularly relating to methods for recovering carbon fibers from composite material waste.

BACKGROUND

Carbon fiber reinforced polymers have many excellent properties, such as high specific strength, high specific modulus, heat resistance, and corrosion resistance, and they are widely used in the aerospace field, in the sports and leisure fields such as in golf club and tennis rackets, and in industrial fields such as in automobiles, in wind power generation equipment, in electronics, and in medical appliances.

A disposal problem exists in leftover materials generated during production, manufacture, scrap products at the end of service life, and other waste carbon fiber composites. Currently, waste carbon fiber reinforced polymer composites are disposed by cutting and grinding into powders or particles to serve as filler or paving material, etc., or disposed by incineration and landfilling. Since carbon fiber reinforced resin composite contains carbon fibers with high value, such disposal results in a tremendous waste of carbon fiber resources.

The related art includes many methods of decomposing resin in waste carbon fiber reinforced resin composites such that the carbon fibers therein are separated, thereby achieving recovery of carbon fibers.

Methods of decomposing resin disclosed in the related art include organic solvent decomposition, inorganic strong acid decomposition, sub/supercritical fluid decomposition, and thermal decomposition.

Organic solvent decomposition may obtain pure carbon fibers, but large amounts of organic solvents are used during the recovery process, which may pollute the environment. Also, the operating processes (liquid separation, extraction, distillation, etc.) of separating the used solvent are complex, resulting in a high recovery cost. Furthermore, this method is selective for the type of matrix resin and for the type of curing agent, and is not suitable for all matrix resins.

Since epoxy resin has a lower acid resistance, it may be degraded by strong corrosive acids such as nitric acid, etc., and carbon fibers with a clean surface may be recovered. However, since strong acids such as nitric acid, etc., have a strong corrosiveness, a requirement for reaction equipment is high, and a requirement for the safety factor of the operation is very high, and post-processing for the reaction is difficult.

Although supercritical water treating method has a feature of being clean and pollution-free, it needs to be performed at a condition of high temperature and high pressure, such that a requirement for reaction equipment is high.

The most industrially feasible method is by thermal decomposition process. The thermal decomposition process includes a fluidized bed process and a pyrolysis process.

The fluidized bed process includes placing the waste carbon fiber reinforced resin composite within hot air to decompose, but due to a serious oxidation reaction and impacts by the reactor and separator, etc., the surfaces of the recovered carbon fibers have a large volume of ravines, the fiber length is shortened and the fiber performance is greatly decreased. In addition, this method is complex in operation.

The traditional pyrolysis process is a method of placing waste carbon fiber reinforced resin composite into an inert atmosphere such as nitrogen, helium, etc., to perform a thermal decomposition. Its process is easy in operation, but it tends to generate a large amount of carbon residues on the surface of the recovered carbon fibers. The existence of such carbon residues has detrimental impacts on subsequent processing and performance of the recovered carbon fibers.

Accordingly, those skilled in the art continue with research and development in field of carbon fiber recycling.

SUMMARY

In one embodiment, a method for recovering carbon fibers from composite material waste includes coating a solid acid powder onto a surface of a composite material waste having carbon fibers and a resin matrix, pyrolyzing the resin matrix of the coated composite material waste in an inert environment; and oxidizing the pyrolyzed resin of the composite material waste in an air environment.

Other embodiments of the disclosed method for recovering carbon fibers from composite material waste will become apparent from the following detailed description, the accompanying drawings and the appended claims.

DETAILED DESCRIPTION

Figure 1:
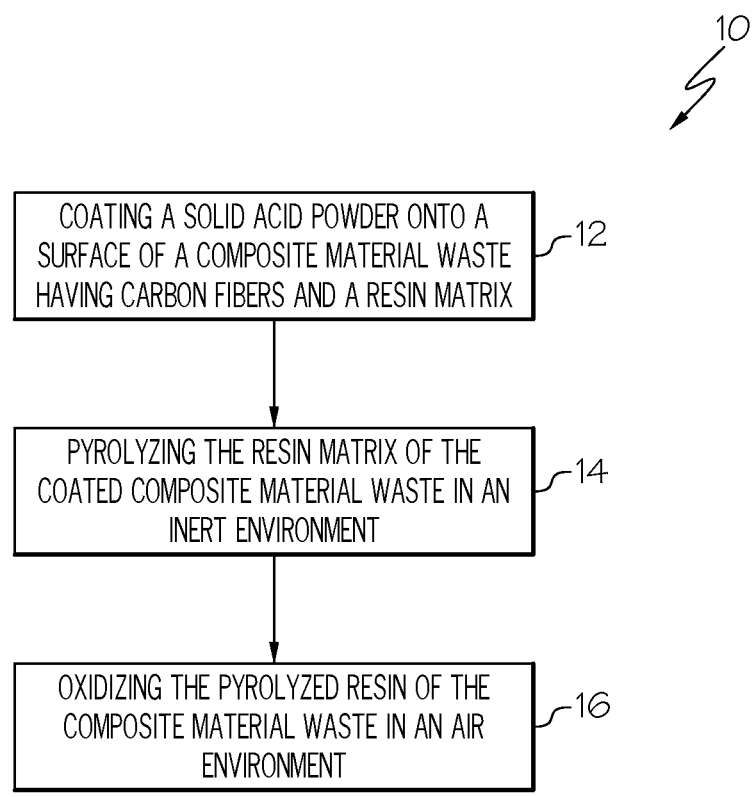
FIG. 1 is a flow chart illustrating a method for recovering carbon fibers from composite material waste according to one embodiment.

Disclosed is a method for recovering carbon fibers from composite material waste. Referring to FIG. 1, one embodiment of the disclosed method, generally designated 10, begins at block 12 with the step of coating a solid acid powder onto a surface of a composite material waste having carbon fibers and a resin matrix. At block 14, the method 10 includes the step of pyrolyzing the resin matrix of the coated composite material waste in an inert environment. At block 16, the method 10 includes oxidizing the pyrolyzed resin of the composite material waste in an air environment.

In an aspect, the step of coating includes spraying a layer of a solid super acid powder, such as solid super acid $SO_4^{2-}/TiO_2$ powder, onto the surface of the composite material waste.

In an aspect, the step of pyrolyzing includes putting the composite material waste into a pyrolysis device and connecting nitrogen to expel air from the device to form the inert environment.

In an aspect, the step of pyrolyzing includes heating the coated composite material waste to a temperature of 500-700° C. for 10 to 30 minutes in the inert environment. In another aspect, the method may further include stopping the heating and naturally cooling to 350-450° C.

In an aspect, the step of oxidizing includes keeping a temperature at 350-450° C. for 10 to 60 minutes. In another aspect, the method may include stopping the heating and naturally cooling to room temperature.

In an aspect, the resin matrix in the composite material waste includes a thermoset resin. The thermoset resin may include at least one of epoxy resin, unsaturated polyester, and phenolic resin.

In an aspect, the resin matrix in the composite material waste includes a thermoplastic resin. The thermoplastic resin may include at least one of polyolefin, nylon, and polyester.

In an aspect, the carbon fiber in the composite material waste includes at least one of polyacrylonitrile-based carbon fiber and asphalt-based carbon fiber.

In an aspect, the carbon fiber in the composite material waste includes at least one of continuous fiber, long fiber, short fiber, powder fiber and carbon fiber fabric.

In an aspect, the method may further include crushing the composite material waste before the pyrolyzing step.

In an aspect, the method may further include processing the carbon fibers recovered from the composite material waste after the oxidizing step.

According to exemplary embodiment, there is a method for recovering carbon fibers from composite material waste via a two-step pyrolysis. The method includes the following two steps.

The first step includes spraying a layer of solid super acid $SO_4^{2-}/TiO_2$ powder onto the surface of composite material waste, then putting the composite into a pyrolysis device and connecting nitrogen for a few minutes to expel air from the device to form an inert environment without oxygen, heating the material within the device to a temperature of 500-700° C. for 10 to 30 minutes, then stopping heating and naturally cooling the material within the device to 350-450° C., the resin matrix in composites being pyrolyzed during this first step.

The second step includes connecting air and keeping the temperature at 350-450° C. for 10 to 60 minutes, followed by stopping heating and naturally cooling to room temperature, and then opening the device to take out the recovered carbon fibers.

Under the above reaction conditions, the resin matrix in the composite material waste has been fully decomposed, and carbon fibers with a clean surface and a structural integrity can be obtained.

In exemplary embodiments, the matrix resin in the composite material waste is epoxy resin. However, the epoxy resin may be replaced with thermoset resin such as unsaturated polyester, phenolic resin, etc., or thermoplastic resin such as polyolefin, nylon, polyester, etc.

In exemplary embodiments, the carbon fiber in the composite material waste is polyacrylonitrile-based carbon fiber. However, the polyacrylonitrile-based carbon fiber may also be replaced with, for example, asphalt-based carbon fiber.

In exemplary embodiments, the form of the carbon fiber in the composite material waste is continuous fiber. However, the continuous fiber may be replaced with, for example, long fiber, short fiber, powder fiber or carbon fiber fabric.

The product formed as a result of the first step is aggregated carbon fibers in bulk, and a large amount of carbon residues are left on the fiber surfaces after the pyrolyzing and vaporizing the resin. The carbon fibers left in this state are unsuitable for subsequent processing, and are not easy to disperse into single fibers during the subsequent processing.

The present description aims to degrade the resin matrix in the waste carbon fiber reinforced resin composite and remove the carbon residues on the surface of carbon fibers generated in the degradation process. Waste carbon fiber reinforced polymer composite is pyrolyzed via the first step, such that the resin matrix is pyrolyzed to generate aggregated carbon fibers in bulk because of a large amount of carbon residues on fiber surface. Then carbon residues on the surface of the carbon fibers are oxidized to generate carbon fibers with a clean surface and a structural integrity via the second step, and carbon fibers in such state are suitable for subsequent processing, and are very easy to be dispersed into single fibers in the subsequent processing operation. Moreover, the retention rate of various properties of carbon fibers may attain 90%.

It may be determined whether the composite material waste need to be crushed in advance based on the relative size of the pyrolysis device. In principle, if the dimension of the pyrolysis device is large enough, waste carbon fiber reinforced resin composite does not need to be crushed, directly being placed into the device to pyrolyze. Waste carbon fiber reinforced polymer composite is easy to be evenly heated after being crushed into a small bulk, thereby to facilitate the pyrolysis reaction, thus it is preferred to pyrolyze after being crushed into a small bulk.

Preferably, since the resin matrix has a poor acid resistance, a solid super acid powder, such as super sold acid $SO_4^{2-}/TiO_2$ powder, can be used to facilitate the degradation of the resin matrix during the reaction process, which is stable at a high temperature.

Preferably, the pyrolysis temperature under nitrogen atmosphere is in a range of 500-700° C. When the temperature is below 500° C., the pyrolysis reaction rate of the matrix resin is slow and thus results in an extension in processing time and an increase in processing cost; when the temperature is above 700° C., the too high pyrolysis temperature will result in an increase in the amount of carbon residues on the surface of the carbon fiber, such that the time of the subsequent oxidation process is prolonged.

Preferably, the reaction time in above pyrolysis temperature is 10-30 minutes. If the pyrolysis time is less than 10 minutes, the pyrolysis process of resin is incomplete. If the pyrolysis time is more than 30 minutes, the content of carbon residues on the surface of carbon fibers is increased, resulting in that the operation cycle is too long, wasting the time and the energy for heating, and thus resulting in an increase in the treating cost.

Preferably, the oxidation step in air will be maintained for 10-60 minutes at a temperature of 350-450° C. Since a large amount of carbon residues are generated under the pyrolyzation condition under nitrogen atmosphere, which directly affects the properties as well as processing and use of carbon fibers, air atmosphere is employed to perform an oxidation treatment under 350-450° C. for the carbon residues on the surface of carbon fibers. Via a thermogravimetric analysis test, carbon fibers can hardly be oxidized in air atmosphere at a temperature below 450° C., so various properties of carbon fibers may not be significantly affected.

Compared with the related art, the methods of the present description have the following advantages. First, the devices employed may be simple, the process is easy, the disposal cost is low, and the method is industrially feasible. Second, the pyrolysis methods set forth by the present description can achieve the sufficient decomposition of the resin in waste carbon fiber reinforced polymer composite, and remove the carbon residues and various impurities on the surface, and is able to keep the recovered carbon fibers to be originally ordered. In this way, the subsequent processing such as sizing, etc., will be favorable, and the carbon fiber is also easy to be dispersed into a single fiber during the processing. Furthermore, the short fiber and the powder fiber products obtained by cutting off and crushing are excellent in dimension uniformity. This greatly improves the convenience of the reuse of recovered carbon fibers.

Figure 2:
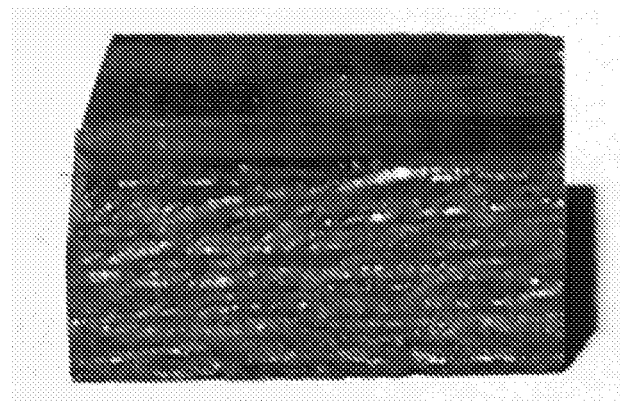
FIG. 2 is an exemplary carbon fiber composite before the method for recovering carbon fibers from composite material waste.
Figure 3:
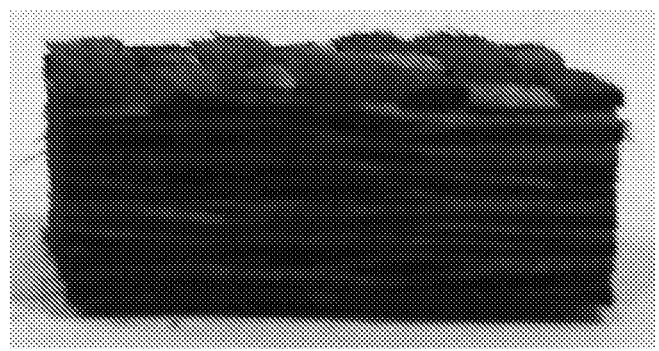
FIG. 3 is the exemplary carbon fiber composite after the step of pyrolyzing.
Figure 4:
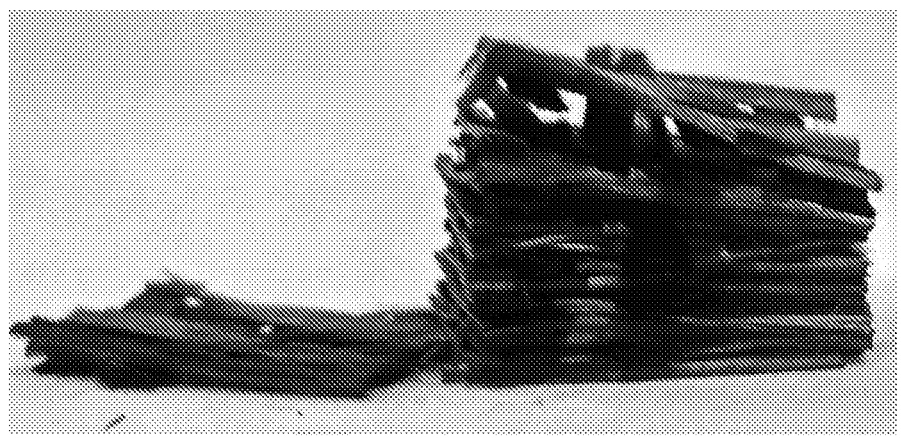
FIG. 4 is the exemplary carbon fiber composite after the step of oxidizing.

Additionally, as for the pyrolysis method set forth by the present description, the treating temperature in an inert atmosphere is 500-700° C., such temperature is very safe for carbon fibers. Since carbon fiber is produced in an inert vacuum atmosphere at a temperature above 1000° C. via carbonization, this pyrolysis step cannot cause the oxidation of carbon fibers, not resulting in a significant effect on the properties of carbon fibers. After the carbon fiber composite (shown in FIG. 2) is pyrolyzed in an inert gas environment, carbon residues will be formed on the surface of the carbon fibers, and the existence of carbon residues may cause the carbon fibers to aggregate into a bulk and cannot be separated from the carbon fiber, which is detrimental to the subsequent processing, as shown in FIG. 3. Therefore, after treating in an inert gas, the carbon residues on the fiber surface are oxidatively removed by connecting air and maintaining at 350-450° C. for 10-60 minutes, and after a suitable oxidation treatment, the carbon fiber with a clean surface and a structural integrity can be obtained, as shown in FIG. 4.

Compared with the related art carbon fiber recovery technology, the present description has solved the following problems: (1) the degradation of composite in inert gas would lead to the aggregated carbon fibers due to the carbon residue; and (2) the degradation of composite in air atmosphere would lead to the dramatic decrease in various properties due to the fiber oxidation. Additionally, the recovered carbon fiber according to the present method is easy to be dispersed into single fiber, which will facilitate the subsequent processing and reuse. The carbon fibers obtained by the present description has a recovery rate of 99%, the retention rate of the single fiber tensile strength is up to 90%, and the operating process is simple and the method is very suitable for industrialization.

The method for recovering carbon fibers from composite material waste according to the present description may achieve an effective separation and recovery of carbon fibers from waste carbon fiber reinforced resin composite, to thereby improve a recovery rate of carbon fibers and reduce a degradation in various properties of carbon fibers, reduce a cost of disposal, save resources and protect the environment.

The invention will be described in detail with reference to the specific examples below.

Example 1

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 500° C., such that the resin in the carbon fiber resin composite was pyrolyzed for 30 minutes at this temperature. When stopping heating and naturally cooling to 400° C., nitrogen connecting was stopped and the furnace chamber was filled with air, and the temperature of the furnace chamber was maintained at 400° C. for 60 minutes, followed by blowing out. The degradation product was taken out after the temperature dropped to room temperature, weighing as 9.55 grams, surface residual carbon rate was (9.55−9.0)/9.0=6.1%. According to ASTM-D3379 standard, carbon fiber was subjected to a monofilament tensile test, and the tensile strength of obtained monofilament was 4.32 GPa. The test value of tensile strength for monofilament of commercial T700 carbon fiber was 4.90 GPa, and the strength retention rate of the recovered carbon fiber monofilament was 4.32/4.90=88.2%.

Example 2

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 600° C., such that the resin in the carbon fiber resin composite was pyrolyzed for 30 minutes at this temperature. When stopping heating and naturally cooling to 400° C., nitrogen connecting was stopped and the furnace chamber was filled with air, and the temperature of the furnace chamber was maintained at 400° C. for 60 minutes, followed by blowing out. The degradation product was taken out after the temperature dropped to room temperature, weighing as 9.53 grams, surface residual carbon rate was (9.53−9.0)/9.0=5.9%. According to ASTM-D3379 standard, carbon fiber was subjected to a monofilament tensile test, and the tensile strength of obtained monofilament was 4.55 GPa. The test value of tensile strength for monofilament of commercial T700 carbon fiber was 4.90 GPa, and the strength retention rate of the recovered carbon fiber monofilament was 4.55/4.90=92.9%.

Example 3

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 650° C., such that the resin in the carbon fiber resin composite was pyrolyzed for 20 minutes at this temperature. When stopping heating and naturally cooling to 400° C., nitrogen connecting was stopped and the furnace chamber was filled with air, and the temperature of the furnace chamber was maintained at 400° C. for 30 minutes, followed by blowing out. The degradation product was taken out after the temperature dropped to room temperature, weighing as 9.65 grams, surface residual carbon rate was (9.65−9.0)/9.0=7.2%. According to ASTM-D3379 standard, carbon fiber was subjected to a monofilament tensile test, and the tensile strength of obtained monofilament was 4.35 GPa. The test value of tensile strength for monofilament of commercial T700 carbon fiber was 4.90 GPa, and the strength retention rate of the recovered carbon fiber monofilament was 4.35/4.90=88.8%.

Example 4

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 700° C., such that the resin in the carbon fiber resin composite was pyrolyzed for 10 minutes at this temperature. When stopping heating and naturally cooling to 450° C., nitrogen connecting was stopped and the furnace chamber was filled with air, and the temperature of the furnace chamber was maintained at 450° C. for 10 minutes, followed by blowing out. The degradation product was taken out after the temperature dropped to room temperature, weighing as 9.37 g, surface residual carbon rate was (9.37−9.0)/9.0=4.1%. According to ASTM-D3379 standard, carbon fiber was subjected to a monofilament tensile test, and the tensile strength of obtained monofilament was 4.59 GPa. The test value of tensile strength for monofilament of commercial T700 carbon fiber was 4.90 GPa, and the strength retention rate of the recovered carbon fiber monofilament was 4.59/4.90=93.7%.

Example 5

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 700° C., such that the resin in the carbon fiber resin composite was pyrolyzed for 10 minutes at this temperature. When stopping heating and naturally cooling to 450° C., nitrogen connecting was stopped and the furnace chamber was filled with air, and the temperature of the furnace chamber was maintained at 450° C. for 30 minutes, followed by blowing out. The degradation product was taken out after the temperature dropped to room temperature, weighing as 9.12 g, surface residual carbon rate was (9.12−9.0)/9.0=1.3%. According to ASTM-D3379 standard, carbon fiber was subjected to a monofilament tensile test, and the tensile strength of obtained monofilament was 4.65 GPa. The test value of tensile strength for monofilament of commercial T700 carbon fiber was 4.90 GPa, and the strength retention rate of the recovered carbon fiber monofilament was 4.65/4.90=94.9%.

Example 6

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 700° C., such that the resin in the carbon fiber resin composite was pyrolyzed for 10 minutes at this temperature. When stopping heating and naturally cooling to 400° C., nitrogen connecting was stopped and the furnace chamber was filled with air, and the temperature of the furnace chamber was maintained at 400° C. for 30 minutes, followed by blowing out. The degradation product was taken out after the temperature dropped to room temperature, weighing as 9.52 g, surface residual carbon rate was (9.52−9.0)/9.0=5.8%. According to ASTM-D3379 standard, carbon fiber was subjected to a monofilament tensile test, and the tensile strength of obtained monofilament was 4.45 GPa. The test value of tensile strength for monofilament of commercial T700 carbon fiber was 4.90 GPa, and the strength retention rate of the recovered carbon fiber monofilament was 4.45/4.90=90.8%.

Example 7

In the selected composite material waste, the carbon fiber was Toray T700, the resin matrix was 4,4'-diaminodiphenylmethane epoxy resin, and the curing agent was diaminodiphenylsulfone, wherein the content of carbon fiber was 60% by weight. A carbon fiber plate with a thickness of 2 mm was cut into about 25 cm$^2$, of which the weighed mass was 15 grams, and the content of carbon fiber was 15×0.6=9.0 grams. The resulting plate was placed into a pyrolysis furnace after uniformly spraying a layer of solid super acid $SO_4^{2-}/TiO_2$ powder on its surface, then the furnace chamber was filled with nitrogen to form an inert environment free of oxygen. The pyrolysis furnace was heated to 700° C., such that the resin in the carbon fiber resin composite was pyrolyzed for 10 minutes at this temperature. When stopping heating and naturally cooling to 350° C., nitrogen connecting was stopped and the furnace chamber was filled with air, and the temperature of the furnace chamber was maintained at 350° C. for 60 minutes, followed by blowing out. The degradation product was taken out after the temperature dropped to room temperature, weighing as 9.62 grams, surface residual carbon rate was (9.62−9.0)/9.0=6.9%. According to ASTM-D3379 standard, carbon fiber was subjected to a monofilament tensile test, and the tensile strength of obtained monofilament was 4.21 GPa. The test value of tensile strength for monofilament of commercial T700 carbon fiber was 4.90 GPa, and the strength retention rate of the recovered carbon fiber monofilament was 4.21/4.90=85.9%.

Figure 5:
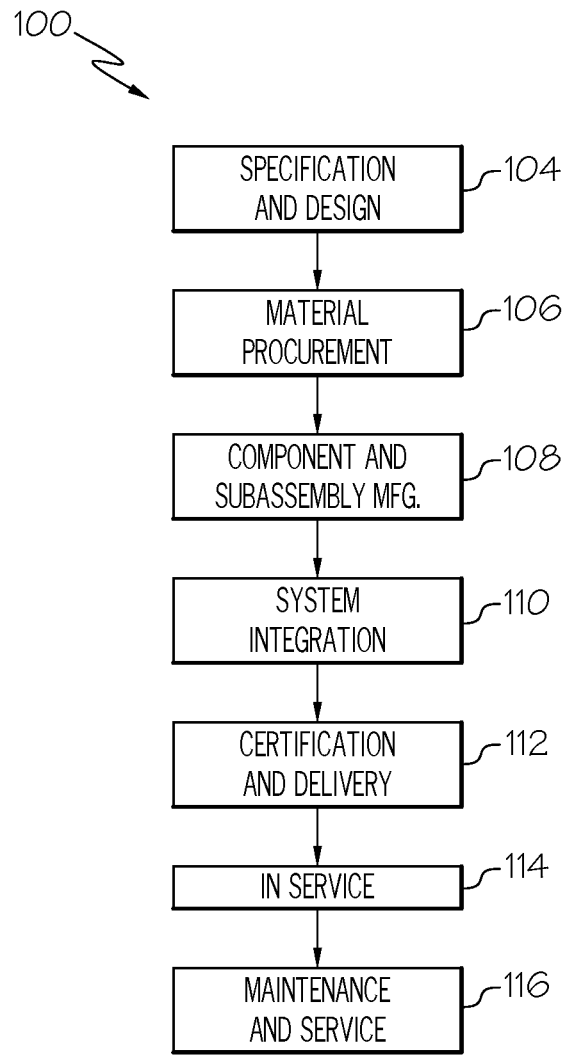
FIG. 5 is flow diagram of an aircraft manufacturing and service methodology.
Figure 6:
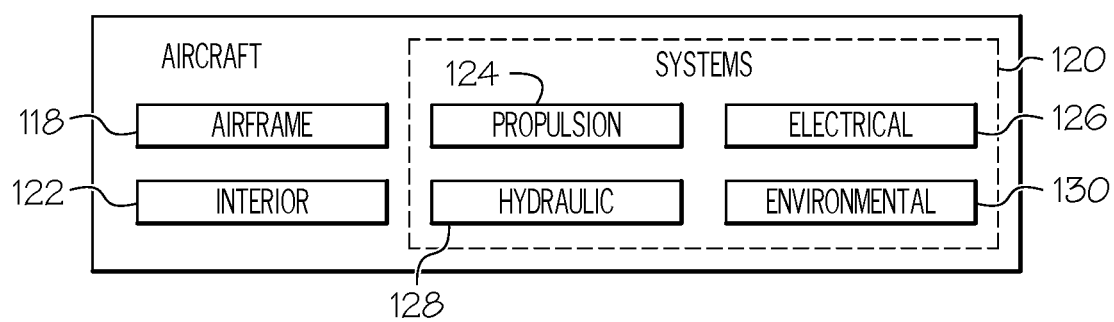
FIG. 6 is a block diagram of an aircraft.

Examples of the present description may be described in the context of an aircraft manufacturing and service method 100, as shown in FIG. 5, and an aircraft 102, as shown in FIG. 6. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed methods may be employed during any one or more of the stages of the aircraft manufacturing and service method 100, particular during material procurement 106, component/subassembly manufacturing 108, system integration 110, and routine maintenance and service 116.

As shown in FIG. 6, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included. The disclosed methods may be employed for any of the systems of the aircraft 902, particularly including any of the system in which carbon fiber containing materials are used. Additionally, the disclosed methods may be employed after retirement of an aircraft 102 from service.

The disclosed methods are described in the context of an aircraft; however, one of ordinary skill in the art will readily recognize that the disclosed methods may be utilized for a variety of vehicles and non-vehicles. For example, implementations of the embodiments described herein may be implemented in any type of vehicle including, e.g., helicopters, passenger ships, and automobiles or in any type of non-vehicle, e.g., sporting goods, construction goods and communication products.

Although various embodiments of the disclosed methods have been shown and described, modifications may occur to those skilled in the art upon reading the specification. The present application includes such modifications and is limited only by the scope of the claims.

What is claimed is:

1. A method for recovering carbon fibers from composite material waste, the method comprising:
   coating a solid acid powder onto a surface of a composite material waste having carbon fibers and a resin matrix;
   pyrolyzing the resin matrix of the coated composite material waste in an inert environment;
   oxidizing the pyrolyzed resin of the composite material waste in an environment containing air; and
   after the oxidizing, recovering carbon fibers from the composite material waste.

2. The method of claim 1 wherein the step of coating includes spraying a layer of solid super acid powder onto the surface of the composite material waste.

3. The method of claim 1 wherein the step of pyrolyzing includes putting the composite material waste into a pyrolysis device and connecting nitrogen to expel air from the device to form the inert environment.

4. The method of claim 1 wherein the step of pyrolyzing includes heating the coated composite material waste to a temperature of 500-700° C. for 10 to 30 minutes in the inert environment.

5. The method of claim 4, further comprising stopping the heating and naturally cooling to 350-450° C.

6. The method of claim 1 wherein the step of oxidizing includes keeping a temperature at 350-450° C. for 10 to 60 minutes.

7. The method of claim 6, further comprising stopping the heating and naturally cooling to room temperature.

8. The method of claim 1 wherein the resin matrix in the composite material waste includes a thermoset resin.

9. The method of claim 8 wherein the thermoset resin includes at least one of epoxy resin, unsaturated polyester, and phenolic resin.

10. The method of claim 1 wherein the resin matrix in the composite material waste includes a thermoplastic resin.

11. The method of claim 10 wherein the thermoplastic resin includes at least one of polyolefin, nylon, and polyester.

12. The method of claim 1 wherein the carbon fiber in the composite material waste includes at least one of polyacrylonitrile-based carbon fiber and asphalt-based carbon fiber.

13. The method of claim 1 wherein the carbon fiber in the composite material waste includes at least one of continuous fiber, long fiber, short fiber, powder fiber and carbon fiber fabric.

14. The method of claim 1 further comprising crushing the composite material waste before the pyrolyzing step.

15. The method of claim 1 further comprising processing the carbon fibers recovered from the composite material waste after the oxidizing step.

16. A method for recovering carbon fibers from composite material waste, the method comprising:
   coating a solid acid powder onto a surface of a composite material waste having carbon fibers and a resin matrix;
   heating the coated composite material waste to a temperature of 500-700° C. for 10 to 30 minutes in an inert environment; and
   cooling the heated composite material and keeping at a temperature at 350-450° C. for 10 to 60 minutes in an environment containing air; and
   after the cooling, recovering carbon fibers from the composite material waste.

17. The method of claim 16 wherein the step of coating includes spraying a layer of solid super acid powder onto the surface of the composite material waste.

18. The method of claim 16 wherein the step of heating the coated composite material waste includes putting the composite material waste into a pyrolysis device and connecting nitrogen to expel air containing oxygen from the device to form the inert environment.

19. The method of claim 16 wherein the resin matrix in the composite material waste includes a thermoset resin.

20. The method of claim 16 wherein the resin matrix in the composite material waste includes a thermoplastic resin.

* * * * *